ರ
2,709,183

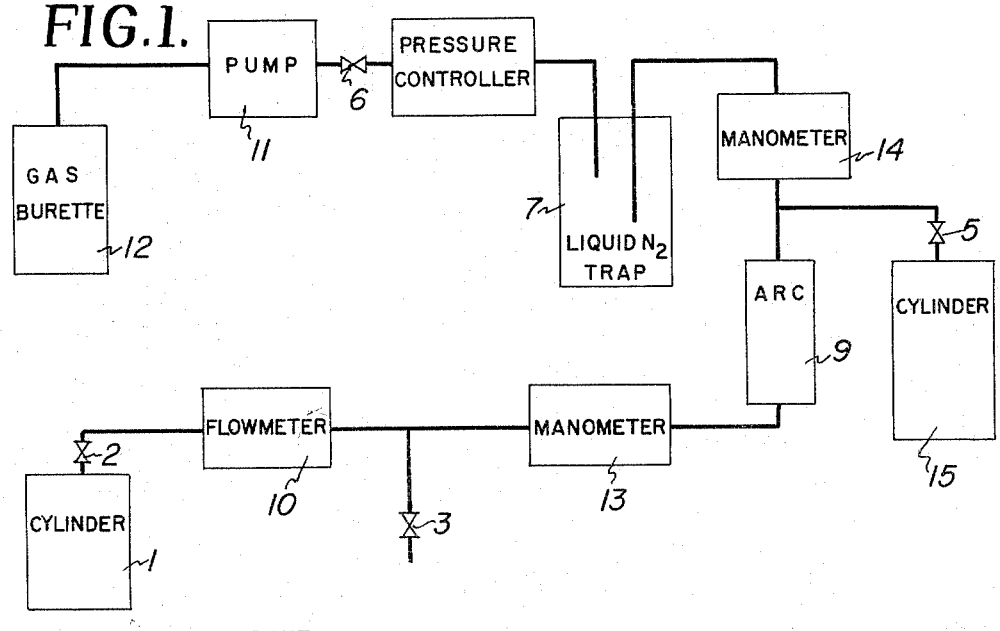
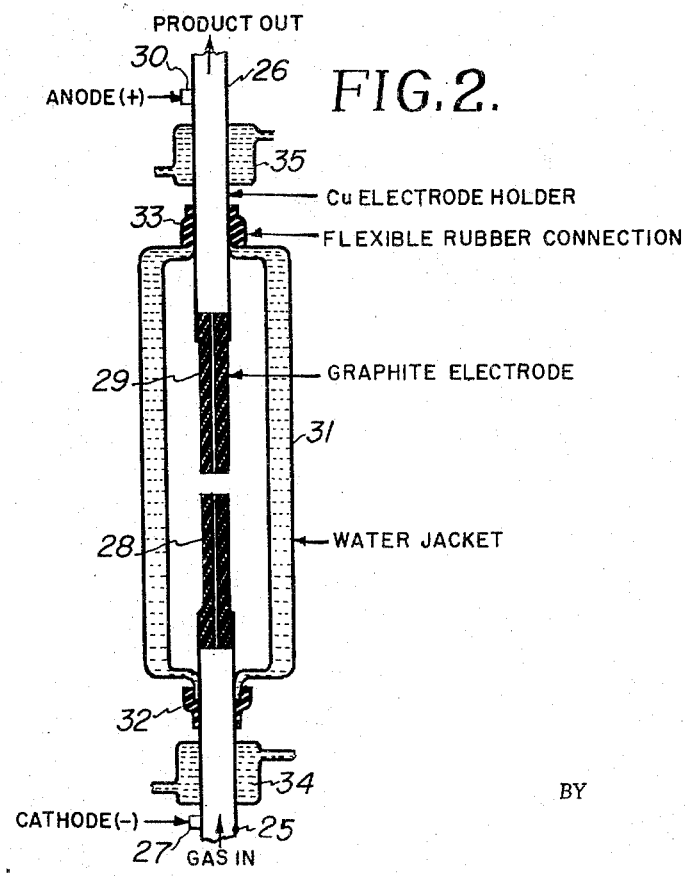

SYNTHESIS OF ALIPHATIC FLUORINE COMPOUNDS FROM HYDROGEN FLUORIDE AND CARBON

Mark W. Farlow, Wilmington, and Robert M. Joyce, Jr., Hockessin, Del., assignors to E. I. du Pont de Nemours and Company, Wilmington, Del., a corporation of Delaware Application December 4, 1953, Serial No. 396,298

7 Claims. (Cl. 260—653)

This invention relates to a new process for preparing aliphatic fluorine compounds.

The fluorocarbons, i. e. compounds containing only carbon and fluorine, and the partly fluorinated hydrocarbons containing carbon, hydrogen and fluorine, are known to possess considerable usefulness in many fields of applied chemistry, for example as refrigerant liquids, dielectric fluids, intermediates for plastics, ingredients of insecticidal compositions, etc. In particular, tetrafluoroethylene has already achieved commercial success in the form of its polymer. However, the relatively high cost of synthesis has prevented the development of really large markets for these compounds. An object of this invention is to provide a new source of fluorine-containing organic compounds from relatively inexpensive starting materials.

It has been discovered, according to this invention that aliphatic fluorine compounds can be made by reacting hydrogen fluoride with a source of carbon at a temperature of at least 2500° C.

The process of this invention can be carried out in various ways. For example, vaporized hydrogen fluoride can be passed, if desired with an inert gas such as nitrogen, through a column of carbon heated at a temperature of at least 2500° C. in a suitable reactor, e. g., a graphite tube placed inside a resistance furnace or an induction furnace. The gaseous reaction products are then liquefied by passing them through cold condensers, and are then fractionated, or they can first be passed through alkaline scrubbing columns to remove the unreacted hydrogen fluoride. A preferred mode of operation consists in reacting hydrogen fluoride with the carbon electrodes of a carbon arc, where the temperature is estimated to be in the range of 2500 to 3500–4000° C., and again condensing the reaction products, removing the unreacted hydrogen fluoride and separating the various components by fractionation in a low temperature still. Preferably, vaporized hydrogen fluoride is contacted with the carbon arc, for example in an apparatus of the type described below. However, it is also possible to operate with the carbon arc submerged in liquid hydrogen fluoride in a suitably designed apparatus equipped with condensers to return the unreacted hydrogen fluoride to the reaction vessel and allow escape of the gaseous reaction products, and with cooling means if necessary.

The reaction temperature can be as high as can practically be obtained by known means. Extremely high temperatures, such as those that can be achieved by use of the carbon arc, represent a desirable embodiment since they lead to higher conversions per pass and increase the proportion of the highly valuable tetrafluoroethylene in the reaction product.

The high temperatures which are required in the practice of this invention can be attained by known methods other than through the use of the electric arc, e. g. by use of fissionable material. Temperatures of the order of magnitude of at least 2500–3300° C. are necessary for practical operations, since the conversions at 1800°–2200° C. are too low for the formation of any detectable quantity of product containing carbon-fluorine bonds during a reaction period of one hour.

Since relatively low percentage conversions (e. g. 1%) during each pass are entirely feasible, suitable means can be provided for continuously or intermittently separating one or more of the condensable products, and recycling the hydrogen fluoride (or gas containing hydrogen fluoride) back through the reaction zone. To increase the production of tetrafluoroethylene, precursors thereof can be recycled with the recovered hydrogen fluoride.

Any source of carbon, including chemically combined carbon, is suitable for the purpose of this invention. Thus, there can be used coal, graphite, diamond, charcoal, carbon monoxide, hydrocarbons (methane, ethylene, acetylene, and homologues of these hydrocarbons, as well as, aromatic hydrocarbons, cycloaliphatic hydrocarbons, etc.), the various forms of carbon black such as lamp black, acetylene black, bone black, etc. When operating by passing hydrogen fluoride over heated carbon in an electric furnace, e. g. in the range of 2500 to 2800° C., better results are obtained with active carbon, of which many well-known varieties are available commercially. In general, active carbon is very finely divided, porous carbon having a total surface area of at least 20 square meters per gram (Hassler, "Active Carbon," Chemical Publishing Co., 1951, page 127). When using the carbon arc, the activity or state of subdivision of the carbon is apparently of no consequence, but the carbon must, of course, possess sufficient conductivity. The carbon need not be rigorously pure and it may, for example, contain the normal amount of ash, e. g., from 0.5 to 4% by weight in the case of most active carbons.

When using finely divided carbon, it is preferable that it be dehydrated prior to use, although the reaction can tolerate the presence of some water.

The hydrogen fluoride need not be rigorously pure. The commercially available so-called anhydrous hydrogen fluoride, which contains minor amounts of water, is entirely suitable.

While the relative proportions of the two reactants are not critical insofar as the course of the reaction is concerned, it is obviously desirable for economic reasons to have the carbon present in excess, in order to utilize as much as possible of the more expensive hydrogen fluoride. Thus, it is preferred to use the two reactants in such proportions that there is present at least 0.25 gram atom, and preferably at least 0.5 gram atom, of carbon per gram mole of hydrogen fluoride. The carbon can be present in large excess, and normally is when using the carbon arc.

The reaction gives a mixture of products normally comprising all the fluoromethanes, some or most of the fluoroethanes, tetrafluoroethylene and other products, among which acetylene is found in variable amounts. These products are readily identifiable by means of infrared spectrographic analysis, and the various components are separable by fractional distillation. The unreacted hydrogen fluoride can be separated in the same manner and recycled over the hot carbon or through the carbon arc, as the case may be. This recycling operation leads to much higher total conversions of the hydrogen fluoride than a single pass operation. However, the hydrogen fluoride need not be recovered as such. It can instead be removed from the mixture of reaction products by treating the latter with an alkaline solution or some other suitable absorbing medium.

It is usually desirable to effect rapid cooling of the reaction products to avoid side reactions or polymerization at the high temperatures used. This is particularly the case when the carbon arc is employed.

The reaction can be carried out at any desired pressure. In conventional equipment, such as tubular reactor containing the carbon through which hydrogen fluoride is passed, it is convenient to use atmospheric pressure, although subatmospheric or superatmospheric pressures can be used. With the carbon arc and vaporized hydrogen fluoride, it is usually desirable to operate at low pressures, e. g., pressures of the order of 5–100 mm. of mercury. When the carbon arc is submerged in liquid hydrogen fluoride, elevated pressures can be used.

Particular embodiments of the invention are illustrated in the accompanying drawing.

A flow sheet of a preferred arrangement of equipment used is shown in Fig. 1. Fig. 2 is a section, more or less diagrammatical, of a carbon arc adapted for use in the process of this invention.

In a typical operation, illustrated by Fig. 1, the gas lines are of 5/16" (outside diameter) copper tubing. The hydrogen fluoride is contained in cylinder 1. At the commencement of the operation valves 2 and 3 are closed, while 5 and 6 are opened. The entire apparatus (with the exception of cylinder 1) is evacuated to remove air. Trap 7 is cooled with liquid nitrogen, whereupon valve 5 is closed, and argon (or other inert gas) is admitted by opening valve 3 (which is connected with a source of the inert gas not shown) to the desired operating pressure (e. g. 20 to 30 mm. of mercury), pressure controller 8 being set to maintain that desired pressure. The arc 9 is struck, the reactant gas is passed through the arc, rate of flow being measured by the flowmeter 10, and the product is condensed in trap 7, except for a small amount of noncondensable gas which passes through controller 8 and pump 11 into gas reservoir 12. During operation, the arc inlet pressure (manometer 13) is appreciably higher than the exit pressure (manometer 14) because of the constriction involved in the arc passages. When it is desired to stop the reaction the arc current is cut off, valves 2 and 6 are closed, valve 5 is opened, cylinder 15 is cooled with liquid nitrogen (−195° C.), trap 7 is allowed to warm to room temperature, and the volatile product is distilled into cylinder 15. Finally, if desired, cylinder 15 can be evacuated to remove traces of argon or other noncondensables, after which the cylinder valve is closed and the product is allowed to warm to room temperature.

Fig. 2 shows a carbon arc suitable for use in this invention. This arc comprises the sections of copper tubing 25 and 26, which serve as electrode holders. Clamped to the section 25 is the outside lead wire connection 27 and mounted at the upper end of section 25 is the carbon electrode 28. This electrode is suitably a graphite cylinder, 5/16" in diameter by 3" long, with an 0.1" hole running longitudinally therethrough for passage of gases. The mounting of the electrode 28 in the copper tubing 25 is a conducting, gas-tight joint, suitably of copper foil wrapped around the graphite cylinder, thus forcing the incoming hydrogen fluoride through the longitudinal passage in the electrode 28. Similarly mounted in the section of copper tubing 26 is the electrode 29, likewise provided with a 0.1" hold running longitudinally therethrough. The anode lead wire connection 30 is clamped to this section 26.

Encasing the eelctrodes is the water jacket 31 which is held in position by the flexible rubber connections 32 and 33, thereby forming a gas-tight compartment around the electrodes. When the material of which the water-jacket is made is electrically conducting, it is of course necessary to insulate it from the electrode holders. There are also provided water-jackets 34 and 35 mounted on the sections of copper tubing 25 and 26, respectively.

The arc is struck by contacting the electrodes 28 and 29 manually through manipulation of one of the two flexible rubber connections 32 and 33, care being taken to avoid contact with uninsulated portions of the apparatus. Thereafter, the electrode gap is controlled to give the desired current. A D. C. or A. C. voltage is applied across the electrodes in the conventional manner. In the case of an A. C. arc, the frequency can be varied over a wide range.

The invention is described in greater detail in the following example, which illustrates the use of the carbon arc.

*Example.*—Gaseous hydrogen fluoride of the commercial, so-called "anhydrous" grade, was passed through the carbon arc in the equipment described above at a rate of 19 g. per hour. The arc was operated at 18–20 amperes and 20 volts, direct current, and at a pressure of 20–30 mm. of mercury. The condensed gaseous reaction product was scrubbed with dilute aqueous alkali to remove the unchanged hydrogen fluoride. The alkali-insoluble gas was found by infrared spectroscopic analysis to contain the following constituents in the indicated molar proportions: acetylene 20, 1,1-difluoroethane 20, trifluoromethane 10, tetrafluoroethylene 3, and carbon tetrafluoride 1, with smaller amounts of each of the following: difluoromethane, fluoromethane and pentafluoroethane. These products could be isolated by low temperature distillation.

It is to be understood that the foregoing example is intended to illustrate, rather than limit, the invention. Numerous modifications of the illustrated process will of course occur to those who are skilled in the art.

One of the advantages of the present invention over other processes for making fluorohydrocarbons lies in the elimination of any need for introducing elementary fluorine into the reaction zone.

The invention is especially valuable and useful for production of polymerizable compounds such as tetrafluoroethylene, and also compounds which can be converted to either tetrafluoroethylene or other useful fluorine-containing organic compounds, by known methods, in subsequent operations.

We claim:

1. A process for preparing fluorine-containing organic compounds which comprises subjecting a source of carbon to reaction with hydrogen fluoride as the sole inorganic reactant at a temperature of at least 2500° C.

2. Process of claim 1 wherein the said carbon source is elementary carbon.

3. Process of claim 2 wherein said reaction takes place by contacting hydrogen fluoride with a carbon arc.

4. Process of claim 3, wherein the said arc operates at a pressure in the range of 5 to 100 mm. of mercury.

5. A process for preparing fluorocarbons which comprises passing hydrogen fluoride through a carbon arc without introducing any other halogen-containing reactant, and conducting the resultant gaseous mixture to a condenser operating at a temperature low enough to cause condensation of at least a part of the said mixture, whereby a condensate containing fluorocarbons is obtained.

6. Process of claim 4 wherein the temperature of the said condenser is not in excess of −195° C.

7. Process of claim 4 wherein the reaction pressure is 20 to 30 mm. of mercury.

References Cited in the file of this patent

UNITED STATES PATENTS

| | | |
|---|---|---|
| 1,402,128 | Wolcott | Jan. 3, 1922 |
| 2,480,560 | Downing et al. | Aug. 30, 1949 |